United States Patent
Takano et al.

(10) Patent No.: US 8,026,928 B2
(45) Date of Patent: Sep. 27, 2011

(54) METHOD, PROGRAM AND APPARATUS FOR GENERATING IMAGE DATA

(75) Inventors: Kohji Takano, Kanagawa-ken (JP); Yoshinori Tanaka, Kanagawa-ken (JP)

(73) Assignee: International Business Machines Corporation, Armonk, NY (US)

(*) Notice: Subject to any disclaimer, the term of this patent is extended or adjusted under 35 U.S.C. 154(b) by 918 days.

(21) Appl. No.: 11/942,842

(22) Filed: Nov. 20, 2007

(65) Prior Publication Data

US 2008/0122847 A1    May 29, 2008

(30) Foreign Application Priority Data

Nov. 28, 2006   (JP) .................................. 2006-320885

(51) Int. Cl.
*G09G 5/00* (2006.01)
(52) U.S. Cl. .................................... 345/619; 345/635
(58) Field of Classification Search .................. 345/619, 345/635
See application file for complete search history.

(56) References Cited

U.S. PATENT DOCUMENTS

| | | | | |
|---|---|---|---|---|
| 5,363,483 A * | 11/1994 | Jones et al. | ............... | 715/766 |
| 6,919,907 B2 * | 7/2005 | Berstis | ............... | 345/619 |
| 7,019,723 B2 * | 3/2006 | Tsuji | ............... | 345/87 |
| 7,034,776 B1 * | 4/2006 | Love | ............... | 345/2.1 |
| 7,138,991 B2 * | 11/2006 | Tsuji | ............... | 345/204 |
| 7,463,215 B2 * | 12/2008 | Love et al. | ............... | 345/1.1 |
| 7,482,569 B2 * | 1/2009 | Shibao | ............... | 250/208.1 |
| 7,505,013 B2 * | 3/2009 | Love | ............... | 345/2.1 |
| 7,570,228 B2 * | 8/2009 | Love | ............... | 345/1.3 |

FOREIGN PATENT DOCUMENTS

| | | |
|---|---|---|
| CN | 1707422 A | 12/2005 |
| JP | 11-038958 | 2/1999 |
| JP | 2002-111893 | 4/2002 |
| JP | 2003-271507 | 9/2003 |
| JP | 2004-005582 | 1/2004 |
| JP | 2002-111893 | 4/2004 |
| JP | 2005-165506 | 6/2005 |
| JP | 2005-167459 | 6/2005 |
| WO | WO 96/18943 | 6/1996 |
| WO | WO 03/036985 | 5/2003 |

* cited by examiner

*Primary Examiner* — Ryan R Yang
(74) *Attorney, Agent, or Firm* — Steven E. Bach

(57) ABSTRACT

A method to realize efficient remote control of the server in a client with a limited display function, while maintaining a GUI-based image and minimizing a data transfer amount from the server, includes: receiving a command concerning a control operation to request an operation of the server from the client; in response to reception of the command, dividing an image displayed on a display screen of the server and detecting a change in the image in each of the divided areas; based on the detected change of the image, generating data of an image for status display to be displayed on the client; and transmitting the data of the image for status display to the client.

16 Claims, 10 Drawing Sheets

FIG. 7

702 DIVISION MANNER TABLE

| CLIENT | POTENTIAL DIVISION MANNER |
|---|---|
| ⋮ | ⋮ |
| ... | 1 DIVISION (NO DIVIDING) |
| CLIENT | UNIFORM DIVISION INTO 3 BY 3 |
| CLIENT | UNIFORM DIVISION INTO 2 BY 2 |
|  | UNIFORM DIVISION INTO 4 BY 4 |
| ⋮ | ⋮ |

METHOD, PROGRAM AND APPARATUS FOR GENERATING IMAGE DATA

FIELD OF THE INVENTION

The present invention relates to a technology for generating data of an image to be displayed on a client in a server. More particularly, the present invention relates to a method, computer program and apparatus for generating data of an image to be displayed on a client on a server side, which can reduce the amount of data to be transferred to the client such as a mobile cell phone or personal digital assistant having a restricted image display function, and which can implement an efficient user interface at the client.

BACKGROUND

Currently, a network-based computer system environment is widely used, wherein clients (client devices, client computers and the like) are connected to a server system composed of a server computer and its peripheral devices (hereinafter, simply referred to as a "server") via a network such as the Internet or the intranet (including in-house LAN). In particular, with the prevalence of the mobile cell phones and personal digital assistants (PDAs), it has become increasingly common to use such instruments as the clients to enable remote control of the server.

FIG. 1 shows a common network-based computer system environment 100 in which a mobile cell phone and a personal digital assistant are used as the clients. As shown in the figure, in the case where a server 102 exists in an intranet 104 that is a local network in an enterprise or organization, a gateway 110 having a firewall 108 for preventing illegal access from the outside is disposed between the intranet and an external network 106 such as the Internet. As such, in order to access the server 102 from clients 112, 114 in an external network environment for the purposes of remote control or the like, it is always necessary to access the gateway 110.

Communication between the gateway and the client such as a mobile cell phone is generally made according to the HTTP (HyperText Transfer Protocol), which means that in order to remotely control the server from the client, it is necessary to know the status of the server by allowing the content of the image displayed on a display of the server as a control target to be displayed on the client side as well. In other words, in order to perform a series of control operations for the remote control, the succeeding control operations need to be performed in accordance with the content of the image displayed on the display of the server that was acquired by the client.

The image displayed on the display of the server, however, cannot be observed by the user on the client side in real time; what can be observed is only the stationary image obtained from the server at that time point. It is often difficult, from only the information of the acquired image, to determine how the image has changed from its previous state.

Further, the mobile cell phone or the personal digital assistant has the display screen of a limited size (that is, the total number of pixels for display is much smaller than that of the display of the server), which means that, if it is tried to display the entire image displayed on the display of the server as a control target on the display screen of a limited size of the mobile cell phone or the like, the image initially expressed using a great number of pixels in the server should be expressed using less pixels, which inevitably results in coarse resolution of the image displayed on the mobile cell phone or the like. For the user observing the image of such coarse resolution displayed on the display screen of the client, it would be very difficult to make accurate judgment of the situation for the succeeding control operation of the server (for example, which portion should be clicked on next).

On the contrary, if it is tried to display an image on the display screen of such a limited size of the client in the same pixel resolution as the one displayed on the display of the server as the control target, only a part of the whole image displayed on the display of the server would be displayed on the display screen of the mobile cell phone or the like, which results in poor prospect of the entire image and, thus, is disadvantageous in terms of user's operability as well as operating efficiency. Furthermore, in this case, particularly when the mobile cell phone or the like has a full browser function, screen scrolling will readily be performed on the display screen of the client if not only the part of the image data but also the image data covering a wide range including its peripheral region is fetched from the server and temporarily stored in an image buffer or the like of the client. In such a case, if the image data for the whole display screen of the server is transferred as the image of the wide range, the amount of data transferred from the server to the client would be huge, which is disadvantageous in terms of communication cost across the network and response speed to the control operation (performance).

There exists a conventional technology for efficiently performing remote control of the server from the client such as a mobile cell phone having a display screen of a small size as described above. Japanese Unexamined Patent Publication (Kokai) No. 2002-111893 discloses an invention of a method for remotely controlling an external computer (i.e., server) in the GUI (Graphical User Interface) environment by a mobile cell phone or other personal digital assistant (i.e., client). Specifically, in response to a control operation from the personal digital assistant, each GUI part displayed on a screen of the external computer is detected, and based on its analysis result, the GUI part is converted into a text or the like so that it can readily be displayed on the personal digital assistant, and the converted data is transmitted to the personal digital assistant to enable remote control of the computer in the GUI environment from the personal digital assistant having a limited display function or the like, with a considerably reduced communication cost therebetween.

This method, however, aims only at implementing remote control of the server in the GUI environment by the client, and the GUI image displayed on the server side is not displayed on the client side exactly in the same form. Further, while it is described that the state of the display screen of the server or its change is detected, it only means that a screen analysis portion and a screen change detection portion obtain information about the name and position of the icon being displayed thereon, from the operating system via the API (Application Programming Interface) or the like. As such, it is not possible to detect a change on screen for an inactive window, or it is not possible even for an active application window to detect in detail how the display therein has changed.

SUMMARY

In view of the foregoing, a major object of the present invention is to implement a user interface for remote control, which can solve the above-described problems currently existing when remotely controlling a server from a client such as a mobile cell phone or the like having only a limited display function, and which allows a user to readily recognize a change in state of the image displayed on a display of the server to efficiently determine a control operation to be carried out next, while maintaining a GUI-based image on the client side similar to the one on the server side and minimizing the amount of data to be transferred from the server.

According to a first aspect of the present invention, there is provided a method, in a server having a client connected thereto via a network, for controlling an image to be displayed on the client, which includes the steps of: (1) in response to receiving from the client an operation command requesting an operation by the server, setting a dividing manner for dividing a display screen of the server into a plurality of sub areas, the dividing manner being set by selecting a value corresponding to said client out of candidate values of dividing manner preliminarily stored in the server; (2) for each of the plurality of sub areas into which the display screen is divided based on the dividing manner set in the setting step, calculating a degree of change of an image displayed on the sub area before and after completion of the operation by the server in response to the operation command; (3) generating data of an image for status display, the image for status display including an image representing relative positional relationship between the plurality of sub areas, and for each of the plurality of sub areas, an image representing the degree of change calculated for the sub area; and (4) transmitting the data of the image for status display to the client so as to be displayed on a display portion of the client.

There are also provided a computer program causing the server to execute the method, and an apparatus in the server capable of implementing the method.

According to a second embodiment of present invention, there is provided a method, in a server having a client connected thereto via a network, for controlling an image to be displayed on the client, which includes the steps of: (1) analyzing a content of the operation command, in response to receiving an operation command from the client; (2) if the analyzed command does not cause a change in display content of the display screen, setting a dividing manner by selecting a value corresponding to said client out of candidate values of dividing manner preliminarily stored in the server, and if the analyzed command causes a change in display content of the display screen, setting a new dividing manner that is determined in accordance with the changed display content; (3) for each of the plurality of sub areas into which the display screen is divided based on the dividing manner set in the setting step, calculating a degree of change of an image displayed on the sub area before and after completion of the operation by the server in response to the operation command; (4) generating data of an image for status display, the image for status display including an image representing relative positional relationship between the plurality of sub areas, and for each of the plurality of sub areas, an image representing the degree of change calculated for the sub area; and (5) transmitting the data of the image for status display to the client so as to be displayed on a display portion of the client. There are also provided a computer program causing the server to execute the method, and an apparatus in the server capable of implementing the method.

According to the present invention, in the case of remotely controlling a server from a mobile cell phone or other client having only a limited display function, it is possible to implement a user interface for the remote control that allows the user to readily recognize a change in state of the image displayed on a display of the server to efficiently determine a control operation that is to be conducted next, while maintaining a GUI-based image on the client side similar to that on the server side, and while minimizing the amount of data to be transferred from the server.

BRIEF DESCRIPTION OF THE DRAWINGS

In the drawings:

FIG. 7 shows an example of a dividing manner table provided in the server;

DETAILED DESCRIPTION

Figure 1:
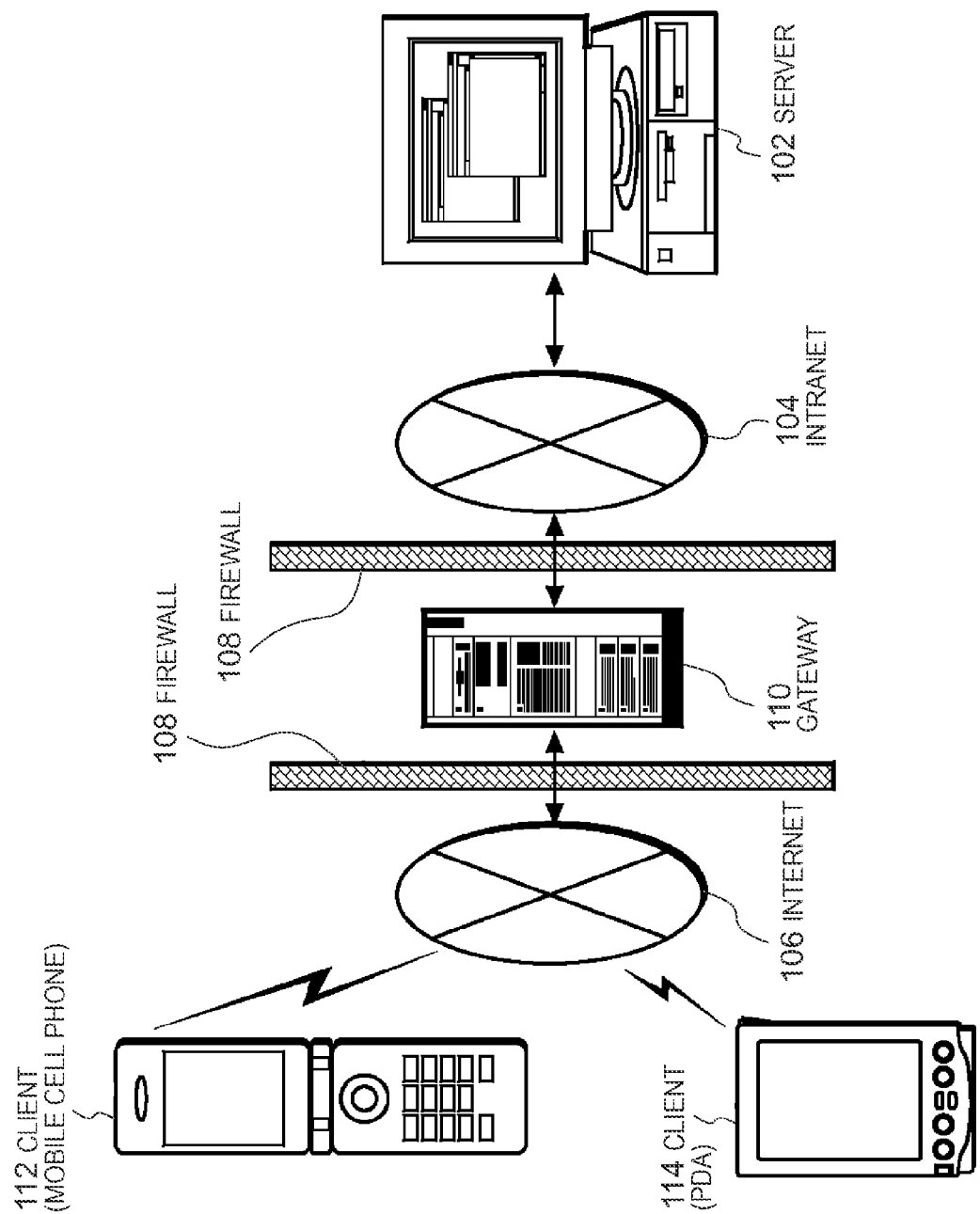
FIG. 1 shows a common network-based computer system environment having a mobile cell phone and a personal digital assistant used as the clients.

Hereinafter, best modes for carrying out the present invention (hereinafter, referred to as the "embodiments") will be described in detail with reference to the accompanying drawings. Through the description of the embodiments, the same elements are denoted by the same reference characters.

Figure 2:
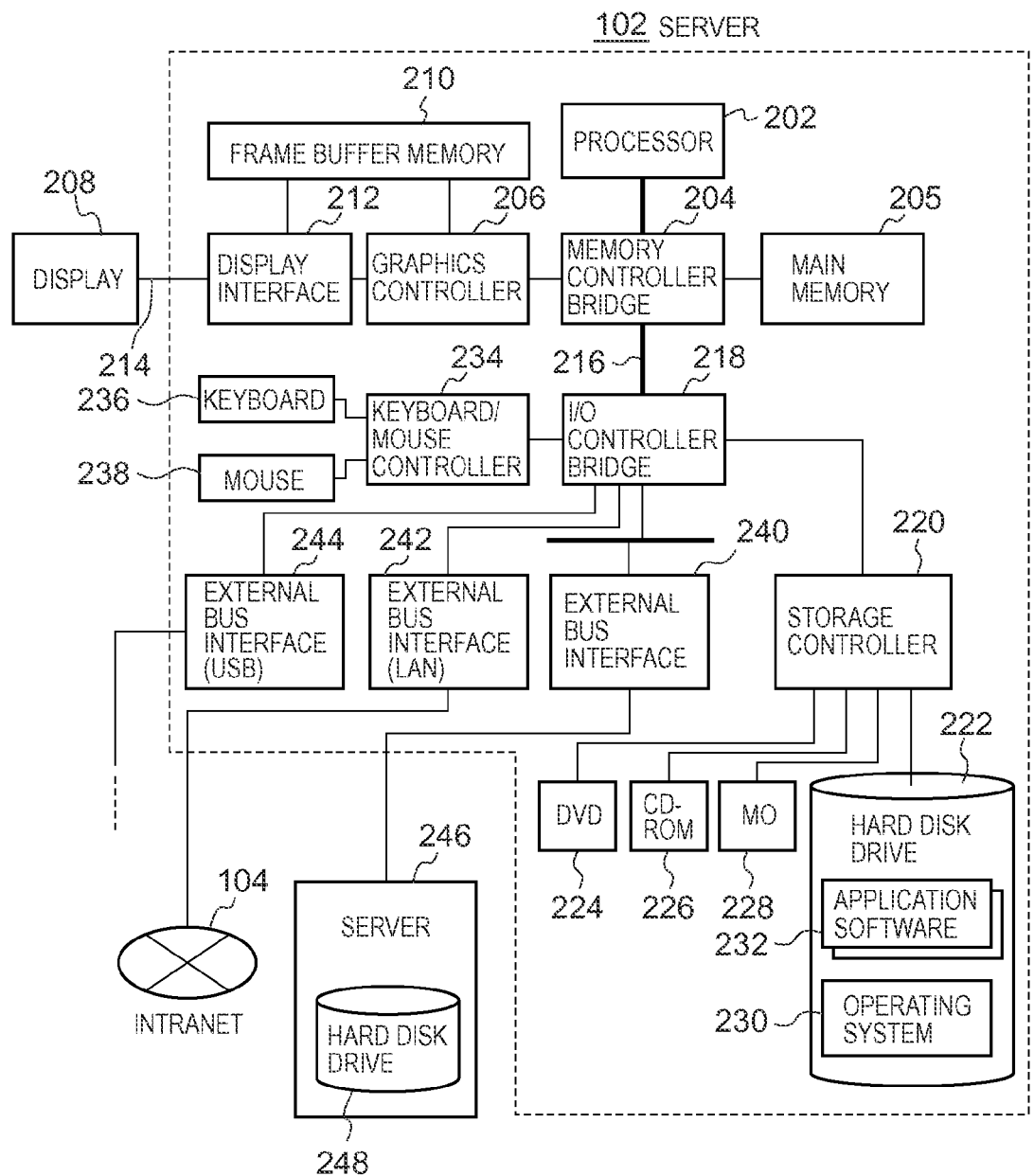
FIG. 2 shows a typical example of a detailed hardware structure of a server suitable for implementing the present invention.

FIG. 2 shows a typical example of a detailed hardware structure of a server 102 which is suitable for implementing the present invention in a common network-based computer system environment, as shown in FIG. 1, in which mobile cell phones and the like are used as the clients.

With this structure, a processor 202 (also referred to as "central processing unit", "CPU", "main processor" or the like) responsible for overall control of the server 102 has a memory controller bridge 204 (also referred to as "memory bridge", "first bridge", "north bridge" or the like) connected in close proximity thereto. The memory controller bridge 204 is directly connected with a main memory 205 (also referred to as "memory", "main storage" or the like) and a graphics controller 206, and primarily performs processing that requires high-speed operations.

The graphics controller 206 generates and controls image data to be displayed on a display 208 (also referred to as "display device" or "displaying device"). A frame buffer memory 210 (also referred to as "frame buffer", "bit map memory", "image memory", "graphics memory" or the like) is a memory capable of buffering (storing) image data for at least one frame of the image to be displayed on the display device 208, and the image data for displaying at least one frame is drawn into the frame buffer memory 210 under the control of the graphics controller 206. A display interface 212 reads the image data drawn in the frame buffer memory 210, converts the data into a signal format conforming to an interface 214 with the display device 208, and transfers the converted data to be displayed on the display device 208. While the frame buffer 210 in the example shown in FIG. 2 is directly connected to the graphics controller 206 and independent from the main memory 205, it may also be possible to allocate part of the main memory as a frame buffer memory, as represented by the UMA (Unified Memory Architecture).

The memory controller bridge 204 is also connected via a bus such as a PCI local bus 216 to an I/O controller bridge 218 (also referred to as "I/O bridge", "second bridge", "south bridge" or the like), and the I/O controller bridge 218 is connected with mass storage devices such as a hard disk drive 222 (also referred to as "HDD", "hard disk", "hard disk storage", "fixed storage" or the like), a DVD 224, a CD-ROM 226, and an MO 228, via a storage controller 220 (including IDE controller, SCSI controller and others). The mass storage devices are capable of storing computer programs such as an operating system 230 necessary for implementing the present invention, and application software 232 or the like that in cooperation with the operating system 230 gives instructions to the processor 202 and the like to implement the present invention. Each computer program is executed as it is loaded to the main memory 205. The computer program may be compressed or divided into a plurality of pieces to be recorded on a plurality of media.

The I/O controller bridge 218 also has a keyboard/mouse controller 234 connected thereto, and receives an input from input devices such as a keyboard 236 and a mouse 238. The I/O controller bridge 218 further has various external bus interfaces 240-244 connected thereto. The external bus interface 240 has another server 246 communicably connected thereto, and all or part of the above-described computer programs may be stored in a hard disk drive 248 constituting the server 246. Further, the server 102 may be connected via the external bus interface 242 to the intranet 104 shown in FIG. 1, which enables communication between the server 102 and the client 112 such as a mobile cell phone via the gateway 110 shown in FIG. 1.

For the operating system 230 stored in the mass storage device of the server 102 and responsible for its overall operation, an operating system supporting the GUI (Graphical User Interface) is adapted, which may be the Windows (R) operating system available from Microsoft Corporation, the MacOS (R) available from Apple Computer Incorporated, or the UNIX (R) based system provided with the X Window System. The UNIX (R) based systems include, for example, AIX (R) available from International Business Machines Corporation, Linux (R) and others.

It will readily be understood from the above description that the server 102 suitable for implementing the present invention may be realized by a regular information processing apparatus such as a personal computer, workstation, mainframe or the like, or a combination thereof. The components of the server shown in FIG. 2 are only illustrative, and all of them are not necessarily indispensable for the present invention. Further, it is of course readily conceivable for a person skilled in the art that various modifications are possible for implementing the present invention; for example, a plurality of servers may be combined and the components described above may be functionally distributed to those servers for implementation. Such modifications are naturally within the spirit of the present invention.

Figure 4A:
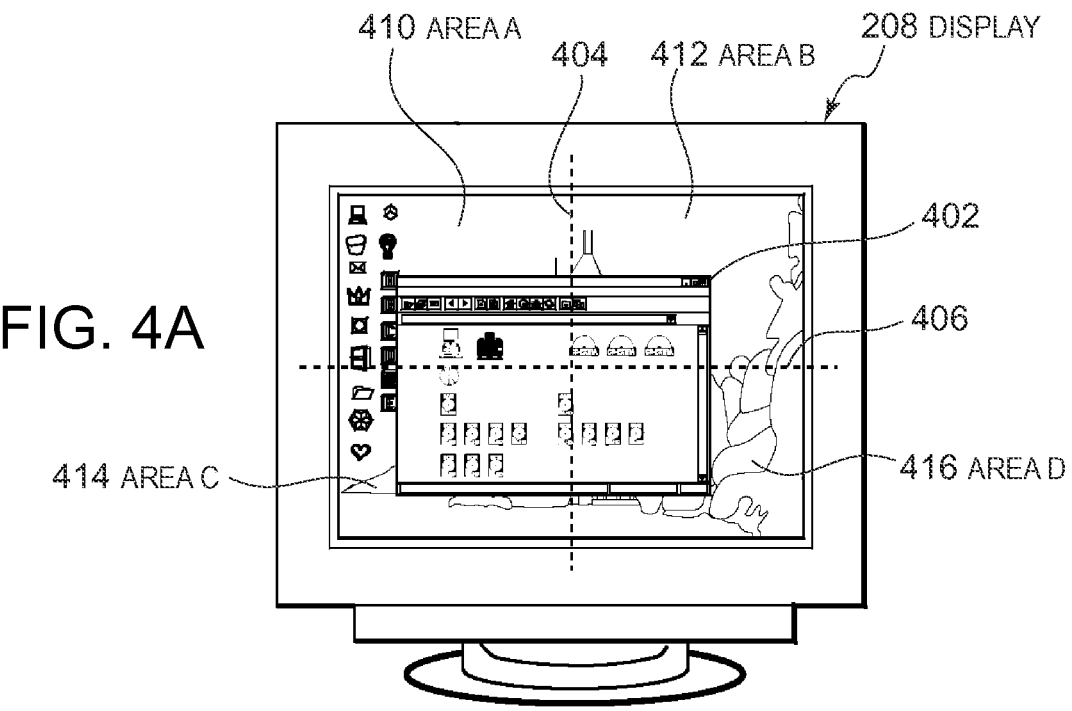
FIGS. 4A and 4B show the states of the display screens of the server and the client according to the first embodiment of the present invention.
Figure 4B:
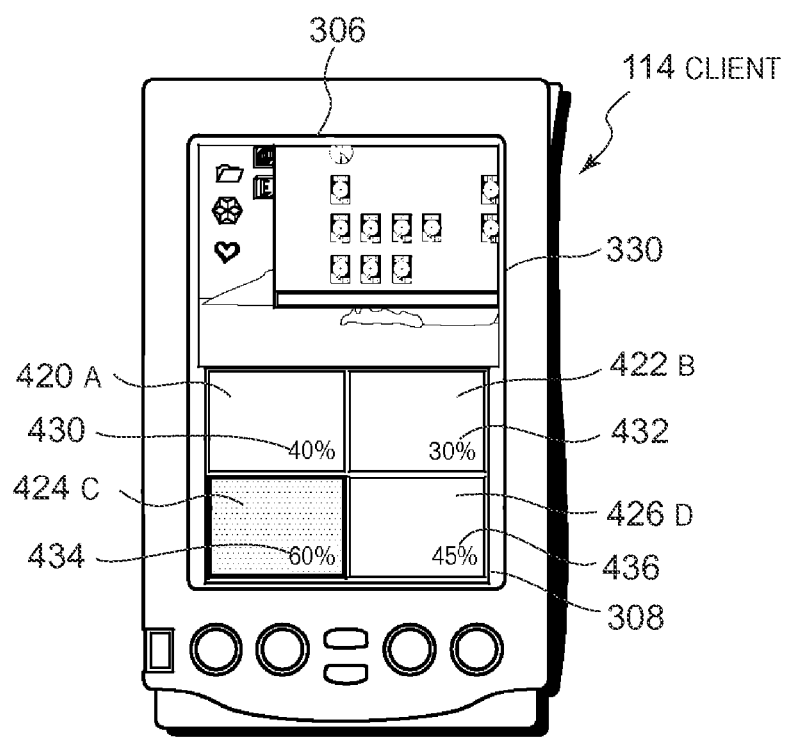
Figure 5A:
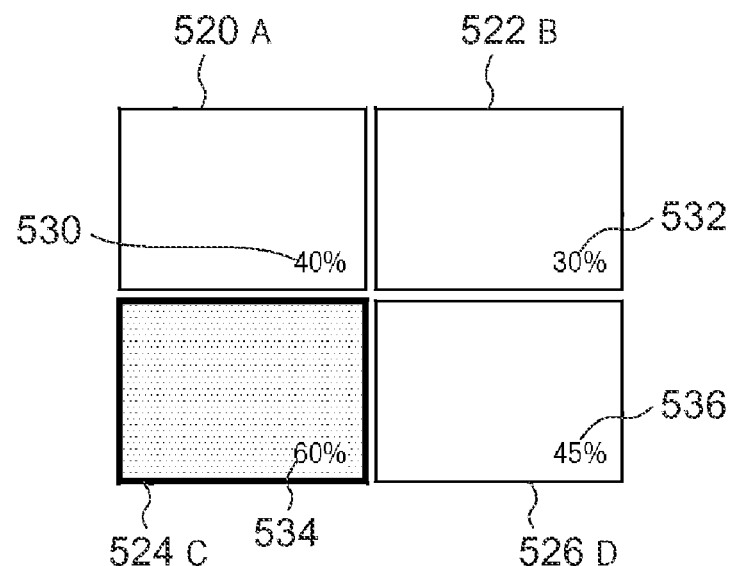
FIGS. 5A through 5C each show an image for status display for the client, generated according to the first embodiment of the present invention.
Figure 5B:
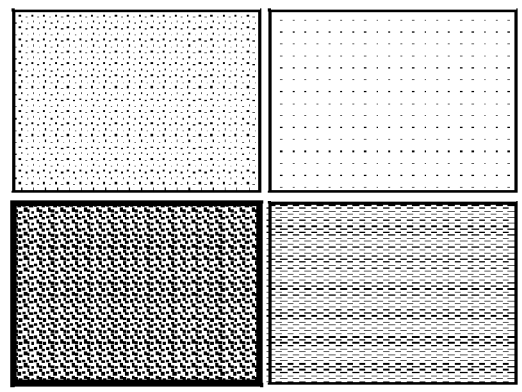
Figure 5C:
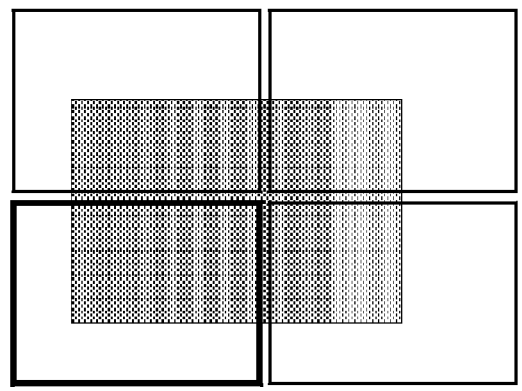
Figure 6:
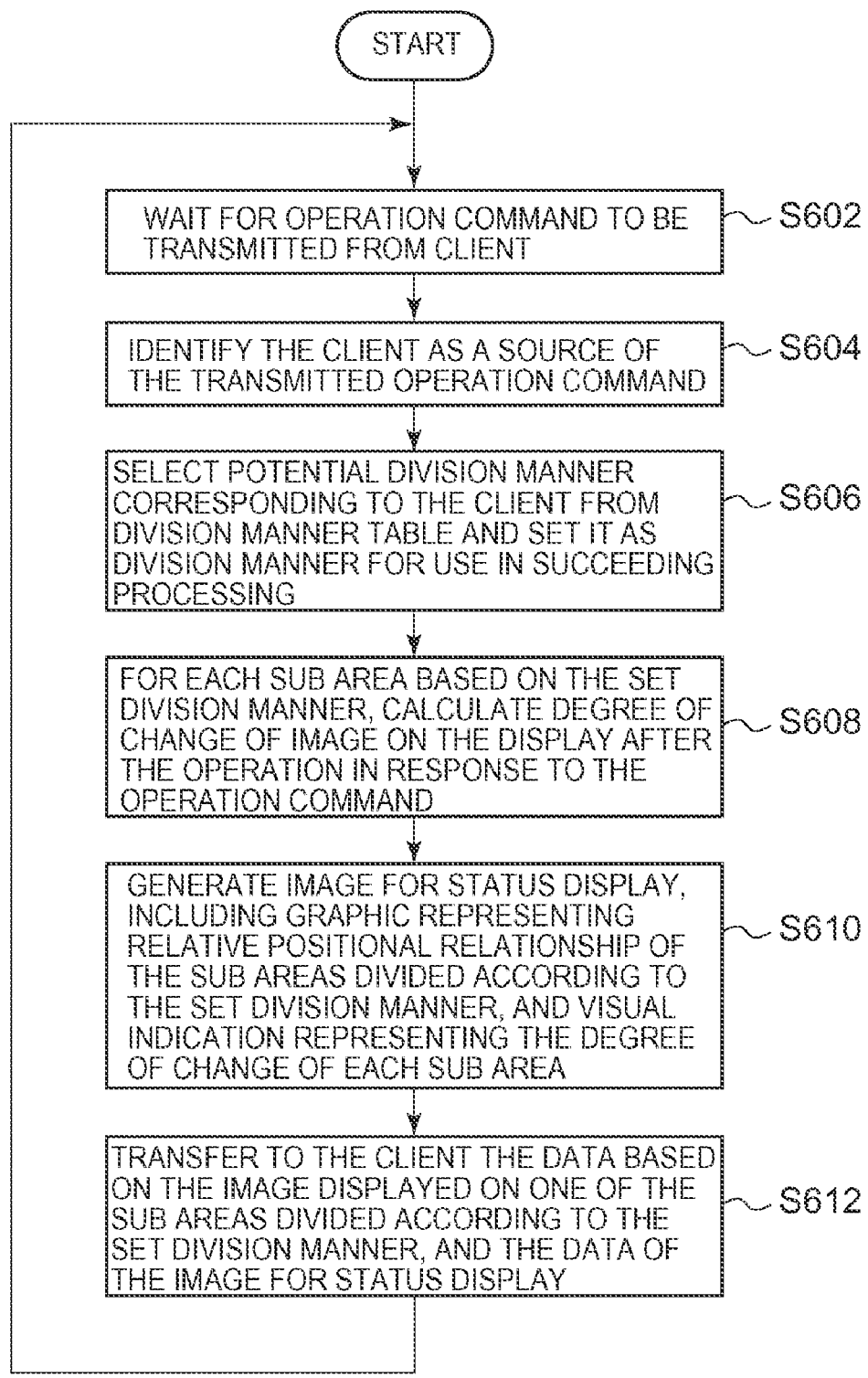
FIG. 6 shows a flow of processing procedure according to the first embodiment of the present invention.

Embodiments of the present invention in the above-described system environment will now be described. FIGS. 3A, 3B, 4A, 4B, and 5A-5C illustrate processing performed in the server 102 and states of the display screen of a client such as a mobile cell phone corresponding thereto, according to a first embodiment of the present invention. FIG. 6 shows a flow of processing procedure according to the first embodiment of the present invention.

Figure 3A:
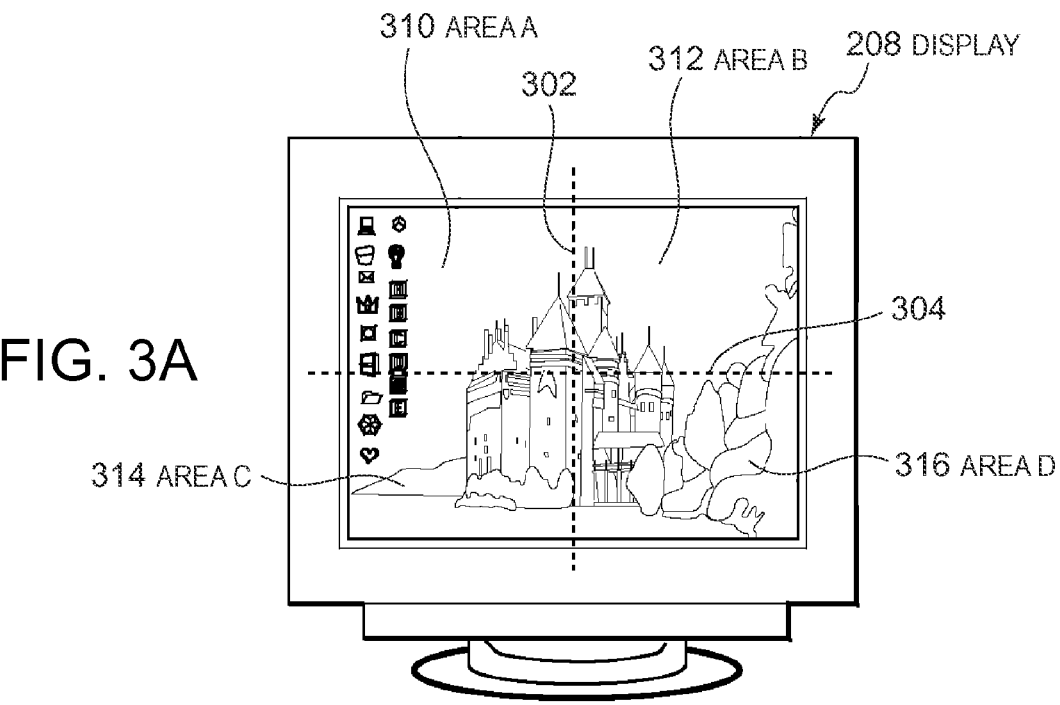
FIGS. 3A and 3B show the states of the display screens of the server and the client according to first and second embodiments of the present invention.

FIG. 3A shows a state of the display screen of the display 208 of the server 102 at a given time point. On the desk top, only a plurality of icons are displayed, with no active or inactive window displayed thereon. Broken lines 302 and 304 in FIG. 3A are dividing lines conceptually indicating current setting of a dividing manner for the client 114, which will be described later, and such dividing lines are not actually displayed on the display 208.

Figure 3B:
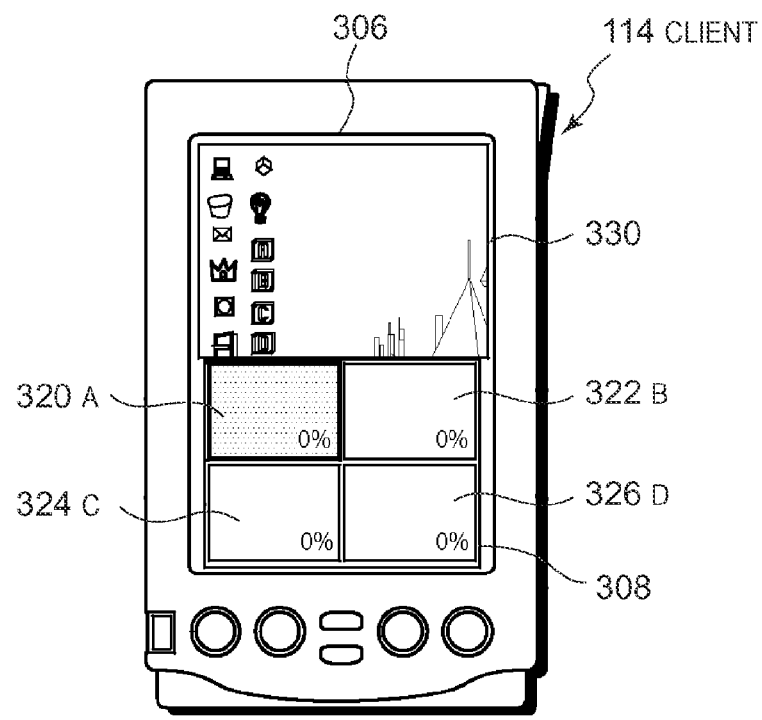

FIG. 3B shows a state of the display screen 306 at this time point of the personal digital assistant-type client 114 connected to the server 102 via the network. The display screen 306 of the client 114 is divided into two sections: a status display portion 308 at the lower section, and an operation screen portion 330 at the upper section. In the status display portion 308, four framed rectangular graphics A 320 to D 326 are displayed to indicate that the entire display screen of the display 208 of the server 102 is divided into four sub areas of area A 310 to area D 316, as shown in FIG. 3A, for processing. In the operation screen portion 330, an image corresponding to the area A 310 in the display screen of the display 208 of the server 102 is displayed, and correspondingly in the status display portion 308, only one of the four rectangular graphics, A 320, is differentiated from the other three rectangular graphics in terms of the outer frame and/or the tone of the background, to facilitate the user's understanding that the image now displayed on the operation screen portion 330 is that of the area A 310.

Hereinafter, an operation of the server 102 according to the first embodiment of the present invention will be described with reference to the processing procedure shown in FIG. 6. The server 102 waits for an operation command requesting a certain operation of the server to be transmitted from the client 114 (step S602). The certain operation may be, for example, to display an active window of the application on the desk top. When the user of the client 114 designates a control operation with respect to the server 102 by clicking on one of the icons displayed on the operation screen portion 330 for example, an operation command corresponding to the relevant control operation is transmitted to the server 102. Upon reception of the operation command, the server 102 firstly identifies the source of the command, i.e., which client issued the command, by reading associated information of the command or the like (step S604).

Further, the server 102 reads and selects a potential dividing manner corresponding to the client 114, which is stored in advance in the form of, e.g., table in the main memory 205 or the like, and sets it as the dividing manner to be used when conducting processing such as generating an image for the client 114, which is to be done from now on in response to the operation command from the client 114 (step S606).

As used herein, the "dividing manner" (manner of division) refers to how the entire display screen of the server 102 is logically divided into a plurality of sub areas in the case where the image data of the divided sub areas are processed in units of the sub areas and image data for display on the client 114 are generated and transferred to the client 114, according to an embodiment of the present invention. The dividing manner typically includes information about the division number indicating how many sub areas the entire display screen is to be divided into, and information about the position, size and shape of each of the divided sub areas in relation to the whole display screen, although it may include other information as well.

Generally, a plurality of clients may be connected to the server 102 in a communicable manner, and it is conceivable that each of the connected clients may transmit an operation command to the server 102. In this case, it would be preferable that a different dividing manner can be set for each client so as to be used when the server 102 performs processing for the client that issued the operation command. To this end, a "dividing manner table" is stored in the main memory 205 or other storage of the server 102, and in this table, potential dividing manners, i.e., dividing manners desired for the clients, are stored in association with the respective clients connectable to the server 102.

FIG. 7 schematically shows an example of the dividing manner table provided in the server 102. The dividing manner table 702 has recording of "uniform division into 2 by 2" as the potential dividing manner for the client 114, which means that the display screen is divided into four rectangular sub areas of equal size, arranged in a 2×2 field of adjacent rows and columns (see an entry 704). While such wording of the dividing manner is used to facilitate the understanding of meaning, the potential dividing manner actually recorded on the dividing manner table 702 may include, for example, pixel-based X-Y orthogonal two-dimensional coordinate values for the pixels corresponding to the four vertices of the rectangle of each sub area, on the display screen of the display 208. That is, with the coordinate of the pixel at the upper left corner of the display screen being represented as (X, Y)=(0, 0), the coordinate of each pixel is represented with the X coordinate value increased in units of pixels to the right and the Y coordinate value increased in units of pixels downward.

For the potential dividing manner for each client, a certain value is initially recorded as a default value, which may be re-recorded in response to a request to change (rewrite) the value from the client at any time point subsequently. That is, the re-recording may take place any time, irrespective of the procedure in FIG. 6.

In the case where such a value is recorded on the dividing manner table 702, the server 102 reads (selects) the record of "uniform division into 2 by 2" as the potential dividing manner for the client 114 from the entry 704 for the client 114 in the table 702, and sets the same as the dividing manner for the client 114 so as to be used upon processing that is to be done for the client 114 subsequently in response to the operation command from the client 114.

Consider now that the operation command from the client 114 is to activate an application and display an active window of the application on the desk top. FIG. 4A shows the state of the display screen of the display 208 of the server 102 after this operation to display the window of the application has been carried out. The active window 402 for the application is displayed on the desk top, slightly lower left of its center. The broken lines 404 and 406 in FIG. 4A are dividing lines conceptually indicating that "uniform division into 2 by 2" has been set as the dividing manner during the processing for the client 114, which does not mean that the broken lines are actually displayed on the display 208.

Next, for each of the sub areas divided based on the dividing manner set in step S606, the server 102 calculates a "degree of change" indicating how much, after the server 102 performed the operation in response to the operation command, the state of the display screen of the display 208 of the server 102 (see FIG. 4A) has changed from the state of the display screen before the relevant operation (see FIG. 3A) (step S608). The degree of change may be, for example, the ratio (%) of the number of pixels having their values changed by the operation with respect to the total number of pixels constituting each sub area. In the present example, as a result of the operation performed by the server 102 in response to the operation command from the client 114, the active window 402 is displayed on the desk top, and the area A 410 in FIG. 4A has 40% of its area at the lower right replaced by the window, so that the numerical value of 40% is derived. Similarly, for the areas B 412 through D 416, the numerical values of 30%, 60% and 45%, respectively, are derived.

It is noted that there conventionally exist various methods for calculating the above-described degree of change in the server 102. For example, when the content of the frame buffer memory 210 in FIG. 2 is rewritten as the result of the operation in response to the operation command from the client 114 is displayed on the display 208, the number of the rewritten pixels may be totaled for each sub area, and its ratio with respect to the total number of pixels in the area may be calculated as the degree of change. As to the other calculating methods, they are already known in the art, and thus, detailed description thereof will not be provided here.

Subsequently, in order for an image for status display to be displayed on the status display portion 308 of the display screen 306 of the client 114, the server 102 generates data of the image for status display. The image for status display includes a graphic enabling visual recognition of the relative positional relationship of the sub areas, and a visual indication enabling visual recognition of the value representing the degree of change in each sub area that was calculated in step S608 (step S610). FIG. 5 shows the state of the image for status display generated in step S610. The dividing manner set in step S606 is "uniform division into 2 by 2", so that a graphic having four rectangular graphics A 520 through D 526 arranged in adjacent two rows and two columns is generated. Further, character string indicators 530 through 536 showing the numerical values calculated in step S608 for the respective sub areas in percentage are generated and superimposed on the corresponding rectangular graphics. Furthermore, only the rectangular graphic C 524 corresponding to the area C 414 that is the sub area having the greatest numerical value calculated is made to have its outer frame and/or tone of the background changed from those of the other three rectangular graphics (for all of the above, see FIG. 5A).

The visual indication enabling visual recognition of the numerical value representing the degree of change may take various forms other than the character string indicator in percentage described above. For example, the tones of the background may be changed in accordance with the calculated numerical values in the corresponding rectangular graphics (see FIG. 5B). The tone may be changed, for example, to make the gray closer to black as the calculated numerical value approaches 100%, and closer to white as the value approaches 0%. It may also be possible to change the tone in each rectangular graphic such that the portion in the rectangular graphic corresponding to the portion in the sub area of the display screen of the display 208 where the pixel values have changed (i.e., the pixels having their values changed) is changed in tone from the remaining portion (where the pixel values have not changed), to allow the user to recognize the degree of change in the graphical sense, rather than from the numerical value (see FIG. 5C). For example, the portion corresponding to the pixels that have changed may be colored black, while the remaining portion may be colored white.

After generating the image for status display in step S610, the server 102 transfers to the client 114 two kinds of image data to be displayed on the display screen of the client 114 (step S612). FIG. 4B shows the state of the display screen of the client 114 after receiving the two kinds of image data from the server 102.

One of the two kinds of image data transferred from the server 102 to the client 114 is data of an image for operation screen that is to be displayed on the operation screen portion 330 at the upper part of the display screen 306 of the client 114. This is the image data corresponding to the image displayed on one sub area selected from among the four sub areas obtained by dividing the entire display screen of the server 102. As a criterion for selecting one sub area, the one having the greatest numerical value representing the degree of change in the sub area may be selected. In FIG. 4B, based on this selection criterion, the area C 414 for which the degree of change obtained is the largest value of 60% is selected, and the image data corresponding to the image displayed on the area C 414 is transferred to the client 114 for display on the operation screen portion 330. It is noted that other selection criteria may also be adapted; for example, a specific sub area (e.g., area A 410 on the upper left) may always be selected.

The other of the two kinds of image data transferred from the server 102 to the client 114 is the data of the image for status display, generated in step S610, to be displayed on the status display portion 308 at the lower part of the display screen 306 of the client 114. That is, the image displayed in the status display portion 308 includes the graphic having four rectangular graphics A 420 through D 426 corresponding to the four sub areas arranged in adjacent two rows and two columns, similarly in the image shown in FIG. 5A, with the character string indicators 430 through 436 representing the numerical values calculated in step S608 for the respective sub areas in percentage being superimposed on the corresponding rectangular graphics. Further, in order to indicate the sub area having the greatest numerical value calculated in step S608, only the rectangular graphic C 424 corresponding to the area C 414 has its outer frame and/or its tone of the background differentiated from those of the other three rectangles.

The first embodiment of the present invention described above has the following advantages. The user of the client 114 can readily decide that the area C would likely be the most important for the succeeding control operation, based on the state displayed on the status display portion 308. Moreover, the state of the area C 414 in the display screen of the display 208 of the server 102 is actually displayed on the operation screen portion 330, which allows the user to confirm the state of the most desired area C 414 or conduct a further control operation thereon.

Generally, in the client 114 having only a small display screen as in the mobile cell phone or portable digital assistant, the numbers of pixels in vertical and horizontal directions for display on the operation screen portion 330 are often much smaller than those of the image displayed on the display 208 of the server 102 that is desired to be displayed on the screen of the client 114. In such a case, the image data of the original image on the display 208 needs to be scaled (reduced in size) to match the numbers of pixels in the vertical and horizontal directions of the operation screen portion 330 of the client 114 before being transferred to the client 114. The image obtained by scaling the sub area will be smaller in reduction ratio than the image obtained by scaling the entire display screen of the display 208, and will result in a finer image when displayed on the operation screen portion 330. As such, the user interface for control operation will considerably improve in the case where the state of the area C 414 is displayed on the operation screen portion 330 as in the first embodiment of the present invention, compared to the case where the state of the whole screen of the display 208 is otherwise displayed on the operation screen portion 330.

Alternatively, in the case where the display screen 306 of the client 114 has the function like full browser, the image data of the original image in the sub area in the server 102 may be transferred to the client 114 as it is, without scaling, and saved in an image buffer (not shown) or the like of the client 114, so that a part of it matching the number of pixels of the operation screen portion 330 may be displayed on the operation screen portion 330. The range to be displayed can be selected from within the range of the image data saved in the image buffer or the like, which ensures high-speed scrolling within the range. In this case, the volume of the image data to be transferred can considerably be reduced when transferring the image data for the sub area than in the case of transferring the image data for the entire display screen of the server 102. In other words, when the image data of the area C is transferred to the client 114 and a part of it is displayed on the operation screen portion 330 of the display screen 306 provided with the full browser function, as in the first embodiment of the present invention, the amount of the image data transferred to the client 114 is reduced to one fourth compared to the case of otherwise transferring the image data of the entire display screen of the server 102 and displaying a part of it on the operation screen portion 330, which is very efficient from the standpoint of communication cost as well as operation performance.

Figure 8A:
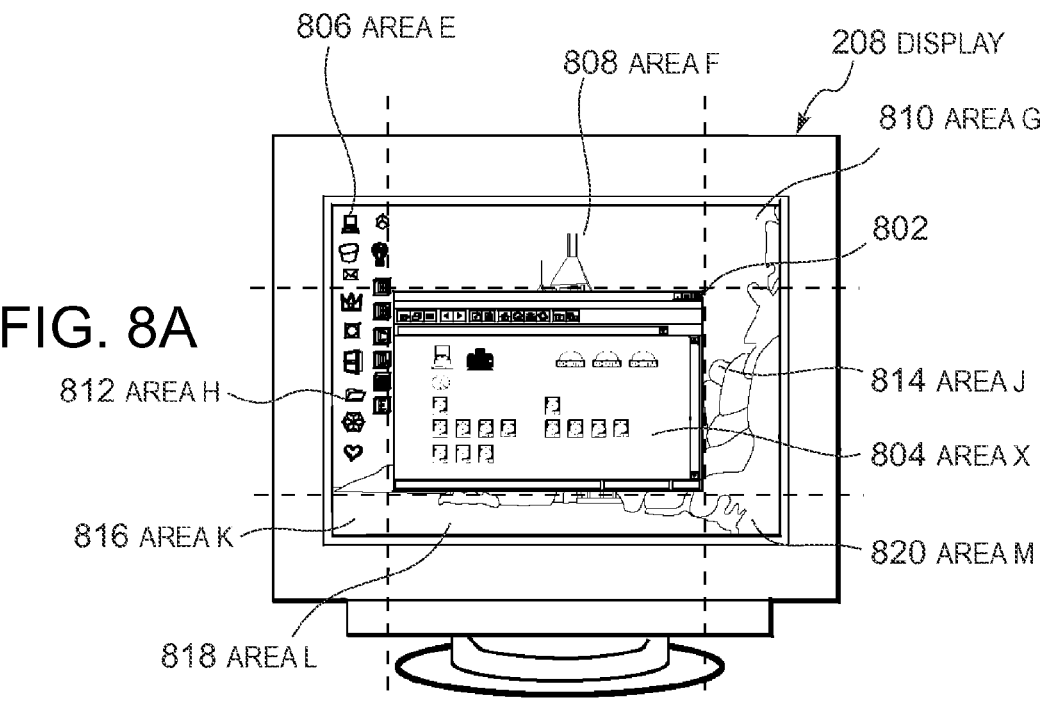
FIGS. 8A and 8B show the states of the display screens of the server and the client according to the second embodiment of the present invention.
Figure 8B:
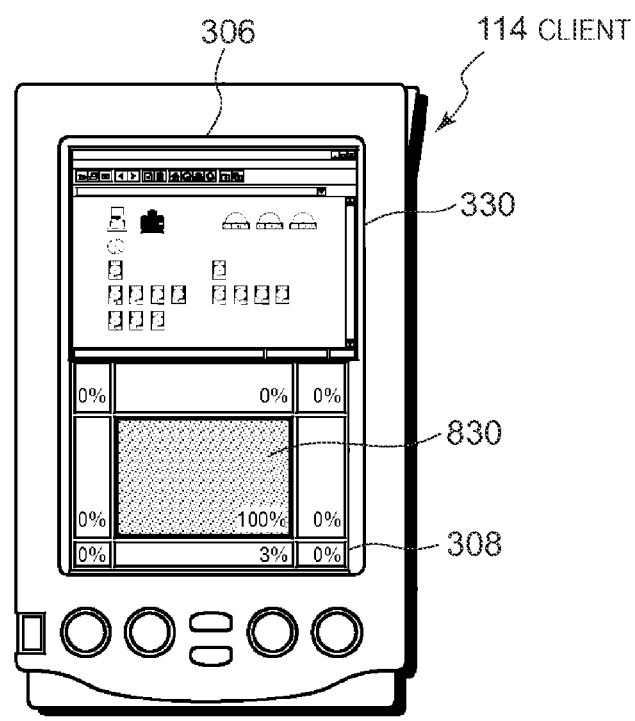
Figure 9:
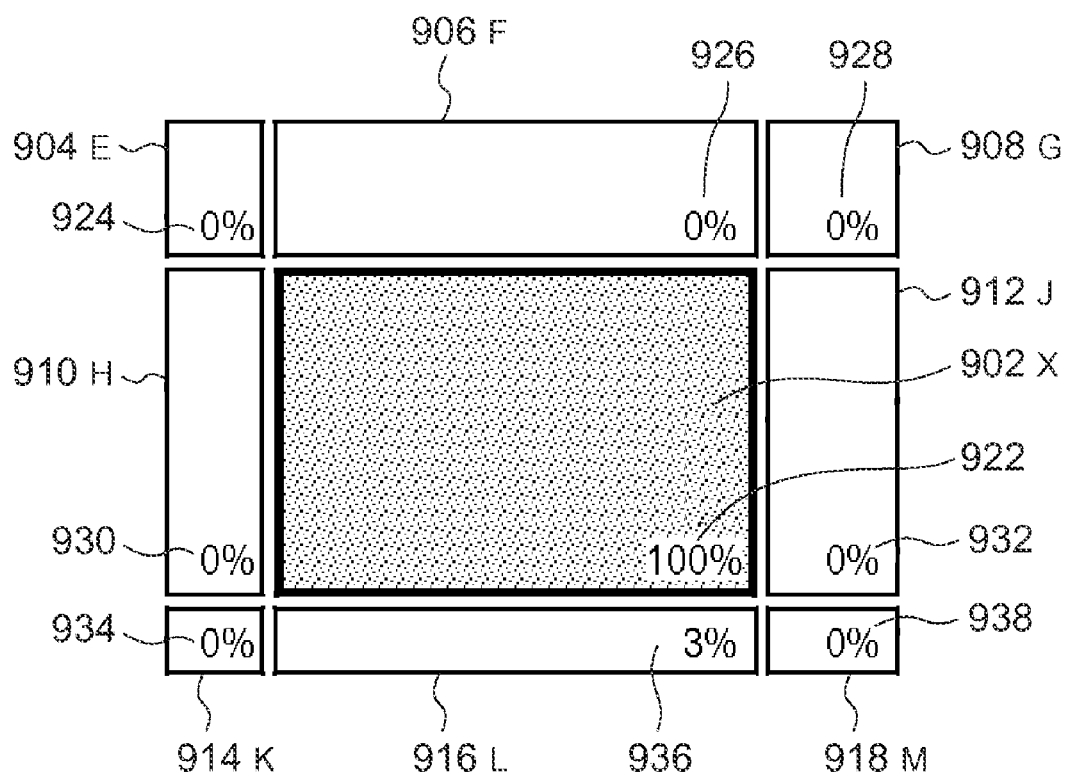
FIG. 9 shows an image for status display for the client, generated according to the second embodiment of the present invention.
Figure 10:
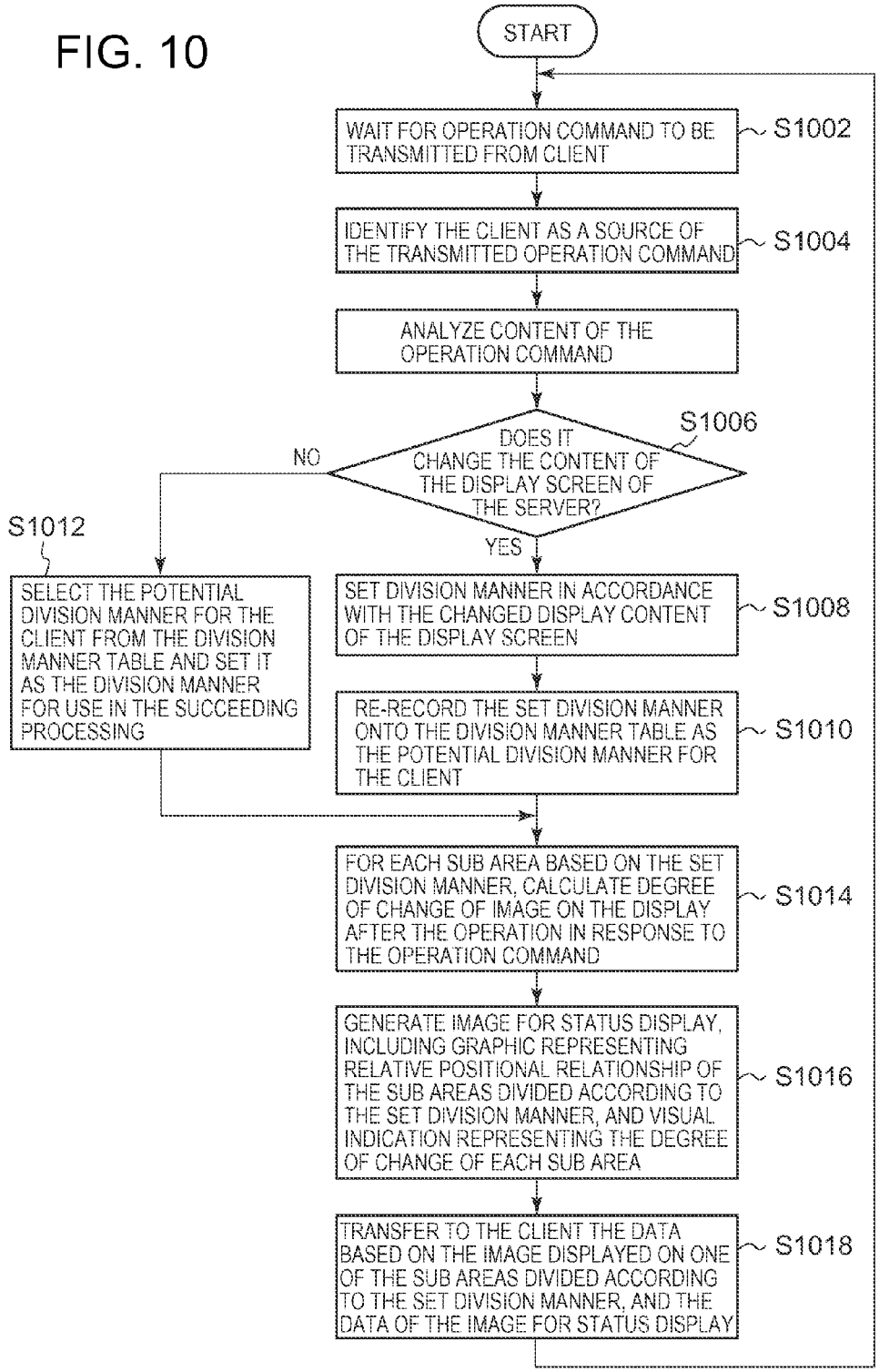
FIG. 10 shows a flow of processing procedure according to the second embodiment of the present invention.

Hereinafter, a second embodiment of the present invention will be described. FIGS. 8A, 8B and 9 illustrate processing carried out in the server and the state of the display screen of a mobile cell phone or other client corresponding thereto, according to the second embodiment of the present invention. FIG. 10 shows a flow of the entire processing according to the second embodiment of the present invention.

It is assumed that the initial state at a certain time point is the same as in the first embodiment of the present invention. That is, as shown in FIG. 3A, on the display screen of the display 208 of the server 102 at a certain time point, only a plurality of icons area displayed on the desk top, with no active or inactive window displayed thereon. The broken lines 302 and 304 in FIG. 3A conceptually indicate the dividing manner set for the client 114 at the current point, which lines are not actually displayed on the display 208. On the client 114 side, as shown in FIG. 3B, four framed rectangular graphics A 320 through D 326 are displayed on the status display portion 308 located at the lower section, to indicate that the processing is being carried out by dividing the entire display screen of the display 208 of the server 102 into four sub areas, and the image corresponding to the area A 310 is displayed on the operation screen portion 330 at the upper section.

An operation of the server 102 according to the second embodiment of the present invention will now be described with reference to the processing procedure shown in FIG. 10. The server 102 waits for an operation command to be transmitted from the client 114 (step S1002). In receipt of the user's operation command from the client 114, the server 102 identifies the source of the command, i.e., which client issued the command, by reading the associated information of the command or the like (step S1004).

Next, the server 102 analyzes the content of the command and determines whether the command causes a change in the display content on the display screen of the server 102 (step S1006). If it is determined that it changes the display content, the server 102 sets a new dividing manner, which is determined in accordance with the changed display content, irrespective of the information of the potential dividing manner for the relevant client 114 prestored in the dividing manner table 702 (step S1008). It is possible to insert, following the step S1008, the step of re-recording the thus set dividing manner onto the dividing manner table 702 as the potential dividing manner for the relevant client (step S1010).

FIG. 8A shows an embodiment for setting the dividing manner in step S1008. If the content of the operation command from the client 114 is to display a new active window on the desk top, the dividing manner recorded as the entry 704 corresponding to the client 114 in the dividing manner table 702, "uniform division into 2 by 2 (into four rectangular sub areas)" is ignored and not set as the dividing manner for the client 114. Instead, the dividing manner to be used for the embodiment is set such that the screen is divided into nine sub areas in total, including: an area X 804 that is the rectangular sub area covering the displayed active window 802, and areas E 806 through M 820 that are the eight rectangular sub areas arranged to surround the area X 804.

If it is determined in step S1006 that it does not change the content of the display screen, the server 102 reads and selects the potential dividing manner for the relevant client 114 stored in advance in the dividing manner table 702, and sets the same as the dividing manner to be used for the embodiment (step S1012). That is, if the operation command is not the one instructing display of a new active window on the desk top, the server 102 sets "uniform division into 2 by 2 (into four rectangular sub areas)" as the dividing manner to be used for the embodiment, based on the potential dividing manner recorded on the entry 704 corresponding to the client 114 in the dividing manner table 702.

Next, for each of the sub areas divided according to the dividing manner set in step S1008 or S1010, the server 102 calculates the degree of change indicating how much, after the operation was conducted by the server 102 in response to the operation command, the state of the display screen of the display 208 of the server 102 (see FIG. 8A) has changed from the state of the display screen before the relevant operation (see FIG. 3A); specifically, it calculates the ratio (%) of the number of pixels having their values changed due to the operation with respect to the total number of pixels constituting each sub area (step S1014). Currently, as a result of the operation by the server 102 in response to the operation command from the client 114, an active window 802 is displayed on the desk top, and the dividing manner set in step S1008 is division into nine rectangular sub areas in total, including the area X 804 covering the active window 802 and the areas E 806 through M 820 arranged to surround the area X 804. Thus, in the area X 804, the active window 802 newly displayed occupies all or almost all the area, so that the ratio of the number of pixels having their values changed by the operation with respect to the total number of pixels constituting the sub area, calculated as the degree of change, becomes almost 100%. In comparison, as for the other eight sub areas (area E 806 through area M 820), the ratio calculated as the degree of change becomes almost 0%, since they do not include any part of the active window 802.

Subsequently, the server 102 generates data of the image for status display so as to be displayed on the status display portion 308 in the display screen 306 of the client 114, which image includes: the graphic enabling visual recognition of the relative positional relationship of the sub areas; and the visual indication enabling visual recognition of the numerical values representing the degrees of change of the respective sub areas calculated in step S1014 (step S1016). FIG. 9 shows the state of the image for status display generated in step S1016. The dividing manner set in step S1008 is division into a total of nine rectangular sub areas including the rectangular sub area covering the active window 802 and the eight rectangular sub areas arranged to surround it, and thus, the graphic having nine rectangular graphics X 902 and E 904 through M 918 arranged in adjacent three rows and three columns is generated to allow the user to recognize the dividing manner. Further, the character string indicators 922 through 938 representing the numerical values calculated in step S1014 for the respective sub areas in percentage are generated and superimposed on the corresponding rectangular graphics. Furthermore, only the rectangular graphic X 902 corresponding to the area X 804, which is the sub area having the greatest numerical value calculated therefor, is differentiated in outer frame and/or tone of the background from the other eight rectangular graphics.

It is needless to say that the visual indication enabling visual recognition of the numerical value indicating the degree of change may take various forms besides the above-described character string indicator, similarly in the case of the first embodiment.

After generating the image for status display in step S1016, the server 102 transfers to the client 114 the image data for display on the display screen 306 of the client 114, as in the first embodiment, which data includes: the data of the image for operation screen to be displayed on the operation screen portion 330 at the upper section, and the data of the image for status display, generated in step S1016, to be displayed on the status display portion 308 at the lower section (step S1018).

FIG. 8B shows the state of the display screen of the client 114 after the two kinds of image data described above have been transferred from the server 102. As for the data of the image for operation screen, the area X 804, which is the sub area having the largest value of 100% as the numerical value calculated in step S1014, is selected from among the nine sub areas obtained by dividing the entire display screen of the display 208 of the server 102, and the image data corresponding to the image displayed on the relevant sub area is transferred as the data of the image for operation screen, and accordingly, the state of the area X 804 is displayed on the operation screen portion 330. It is noted that other selection criteria may also be used, as in the case of the first embodiment.

Displayed on the status display portion 308 is, similarly the one shown in FIG. 9, the image of the graphic having nine rectangular graphics corresponding respectively to the nine sub areas arranged in adjacent three rows and three columns, with the character string indicators representing in percentage the numerical values calculated in step S1014 for the respective sub areas being superimposed on the corresponding rectangular graphics. Further, in order to indicate the sub area having the greatest numerical value calculated in step S1014, only the rectangular graphic 830 corresponding to the area X 804 has its outer frame and/or tone of the background differentiated from those of the other eight rectangles.

The second embodiment of the present invention, compared to the first embodiment, has further advantages as follows. While the state of the area C 414 is displayed on the operation screen portion 330 in the first embodiment as shown in FIG. 4B, the area C 414 does not cover the entire active window 402, which means that an item that the user wishes to operate next may not be included in the area C. In this case, the user needs to transmit to the server 102 a request to switch the source of the image displayed on the operation screen portion 330 to successively check the contents displayed on the other sub areas. In contrast, according to the second embodiment of the present invention, the state of the area X 804, which is the sub area including the entire active window 802 displayed on the display 208, is displayed on the operation screen portion 330. Accordingly, there is substantially no need for the user to switch the source of the image displayed on the operation screen portion 330 for a next control operation, considering that the object of the next control operation must be included in that area X 804.

While the processing procedures according to the first and second embodiments of the present invention have been explained above, these processing procedures may be accomplished when a computer program, such as the application software 232 or the operating system 230 stored in the hard disk drive 222 or the like of the server 102, uses the processor 202 and other components of the server 102 to cause the components to execute the same. In other words, the present invention may be understood as a computer program that causes the server 102 to execute the processing procedures.

Further, these processing procedures may be accomplished by causing the graphics controller 206 or other hardware component included in the server 102 to execute the same. In other words, the present invention may be understood as an apparatus provided with a block executing the processing procedures.

While some embodiments of the present invention have been described above, many other embodiments are possible for the present invention, and the above embodiments do not restrict the claimed invention. That is, it is apparent for a person skilled in the art that various modifications or improvements are possible for the embodiments above. It is also apparent from the recitation in the claims that such modified or improved embodiments may be included in the technical scope of the present invention.

What is claimed is:

1. A method, in a server having a client connected thereto via a network, for controlling an image to be displayed on the client, comprising the steps of:
   in response to receiving from the client an operation command requesting an operation by the server, setting a dividing manner for dividing a display screen of the server into a plurality of sub areas, the dividing manner being set by selecting a value corresponding to said client out of candidate values of dividing manner preliminarily stored in the server;
   for each of the plurality of sub areas into which the display screen is divided based on the dividing manner set in the setting step, calculating a degree of change of an image displayed on the sub area before and after completion of the operation by the server in response to the operation command;
   generating data of an image for status display, the image for status display including an image representing relative positional relationship between the plurality of sub areas, and for each of the plurality of sub areas, an image representing the degree of change calculated for the sub area; and
   transmitting the data of the image for status display to the client so as to be displayed on a display portion of the client.

2. The method according to claim 1, further comprising the step of transmitting, to the client, data of an image displayed on one of the sub areas divided based on the set dividing manner, so that all or part of the image is displayed on the display portion of the client.

3. The method according to claim 2, wherein the one of the plurality of sub areas divided based on the set dividing manner corresponds to the sub area having the largest value calculated in the step of calculating the degree of change.

4. The method according to claim 2, wherein in the display portion of the client, all or part of the area in which the image for status display is displayed and all or part of the area in which all or part of the one sub area is displayed overlap each other, and in the overlapping area, the image for status display and the image of all or part of the image of the one sub area are displayed in a superimposed manner.

5. The method according to claim 1, further comprising the step of analyzing a content of the operation command, in response to receiving the operation command from the client, wherein
   the step of setting the dividing manner includes the steps of:
      if the analyzed command does not cause a change in display content of the display screen, setting the dividing manner by selecting a value corresponding to said client out of the candidate values of dividing manner preliminarily stored in the server, and
      if the analyzed command causes a change in display content of the display screen, setting a new dividing manner according to the changed display content.

6. The method according to claim 5, wherein the dividing manner includes the number of sub areas into which the display screen is divided, and a position, size and shape occupied in the display screen by each of the plurality of sub areas according to the division.

7. The method according to claim 6, wherein the step of setting a new dividing manner according to the changed display content includes the step of determining, if a window is newly displayed on the display screen, the position, size and shape occupied in the display screen by each of the plurality of sub areas according to the division, so that one of the sub areas includes the window as a whole.

8. The method according to claim 1, wherein the step of calculating the degree of change includes the step of calculating, for each of the plurality of sub areas divided based on the set dividing manner, a ratio of pixels changed before and after completion of the operation in response to the operation command, with respect to all the pixels in the sub area.

9. The method according to claim 8, wherein the step of generating data of the image for status display includes the steps of:
   generating a base image having rectangular graphics corresponding to respective ones of the plurality of sub areas arranged based on the relative positional relationship of the sub areas; and
   for each of the plurality of sub areas, superimposing a character image visualizing the ratio calculated for the sub area on the rectangular graphic corresponding to the relevant sub area in the base image,
   to thereby generate the data of the image for status display.

10. The method according to claim 8, wherein the step of generating data of the image for status display includes the steps of:
    generating a base image having rectangular graphics corresponding to respective ones of the plurality of sub areas arranged based on the relative positional relationship of the sub areas; and
    for each of the plurality of sub areas, superimposing a graphic visualizing a relative position in the sub area of pixels changed before and after completion of the operation in response to the operation command, .on the, rectangular graphic corresponding to the relevant sub area in the base image,
    to generate the data of the image for status display.

11. The method according to claim 9, wherein in the base image, only one of the plurality of rectangular graphics that corresponds to the sub area having the largest value calculated in the step of calculating the degree of change is differentiated in color, pattern and/or shape from the other rectangular graphics.

12. A method, in a server having a client connected thereto via a network, for controlling an image to be displayed on the client, comprising the steps of:
- receiving a command concerning a control operation to request an operation of the server from the client;
- in response to receiving the command, dividing an image displayed on a display screen of the server and detecting a degree of change in image in each of the divided areas;
- based on the detection of the degree of change in image, generating data of an image for status display to be displayed on the client, the image for status display including an image representing a relative positional relationship between the plurality of sub areas and for each of the plurality of sub areas, an image representing the degree of change detected for the sub area; and
- transmitting the data of the image for status display to the client.

13. The method of claim 12, wherein the dividing manner is set by selecting a value corresponding to the client out of candidate values of dividing manner preliminarily stored in the server.

14. The method of claim 12, wherein the changes in the sub areas are determined for images before and after completion of the operation by the server in response to the operation command.

15. A computer program product including instructions tangibly embodied on anon-volatile computer readable storage medium, in a server having a client connected thereto via a network, for controlling an image to be displayed on the client, the instructions comprising:
- instructions for setting, in response to receiving from the client an operation command requesting an operation by the server, a dividing manner for dividing a display screen of the server into a plurality of sub areas, the dividing manner being set by selecting a value corresponding to said client out of candidate value of dividing manner preliminarily stored in the server;
- instructions for calculating, for each of the plurality of sub areas into which the display screen is divided based on the set dividing manner, a degree of change of an image displayed in the sub area before and after completion of the operation by the server in response to the operation command;
- instructions for generating data of an image for status display, the image for status display including
  - an image representing relative positional relationship between the plurality of sub areas, and
  - for each of the plurality of sub areas, an image representing the degree of change calculated for the sub area; and
- transmitting the data of the image for status display to the client so as to be displayed on a display portion of the client.

16. An apparatus, in a server having a client connected thereto via a network, for controlling an image to be displayed on the client, comprising:
- a processor; and
- a memory operably connected to the processor;
- wherein the memory has encoded thereon, programs of instruction executable by said processor, said programs of instruction comprising:
- a dividing manner setting portion for setting, in response to receiving from the client an operation command requesting an operation by the server, a dividing manner for dividing a display screen of the server into a plurality of sub areas, the dividing manner being set by selecting a value corresponding to said client out of candidate values of dividing manner preliminarily stored in the server;
- a degree of change calculating portion for calculating, for each of the plurality of sub areas into which the display screen is divided based on the set dividing manner, a degree of change of an image displayed on the sub area before and after completion of the operation by the server in response to the operation command;
- a data generating portion for generating data of an image for status display, the image for status display including
- an image representing relative positional relationship between the plurality of sub areas, and
- for each of the plurality of sub areas, an image representing the degree of change calculated for the sub area; and
- a data transmitting portion for transmitting the data of the image for status display to the client so as to be displayed on a display portion of the client.

* * * * *